No. 648,183. Patented Apr. 24, 1900.
U. WEDGE.
ROASTING FURNACE.
(Application filed Sept. 29, 1898.)
(No Model.) 4 Sheets—Sheet 1.

Witnesses
Myron B. Vorce.
Ernest G. Wilcox.

Utley Wedge, Inventor
By his Attorney

No. 648,183. Patented Apr. 24, 1900.
U. WEDGE.
ROASTING FURNACE.
(Application filed Sept. 29, 1898.)
(No Model.) 4 Sheets—Sheet 2.

Witnesses
Myron B. Vorce.
Ernest G. Silcox.

Utley Wedge Inventor
By his Attorney
C. M. Vorce

THE NORRIS PETERS CO., PHOTO-LITHO., WASHINGTON, D. C.

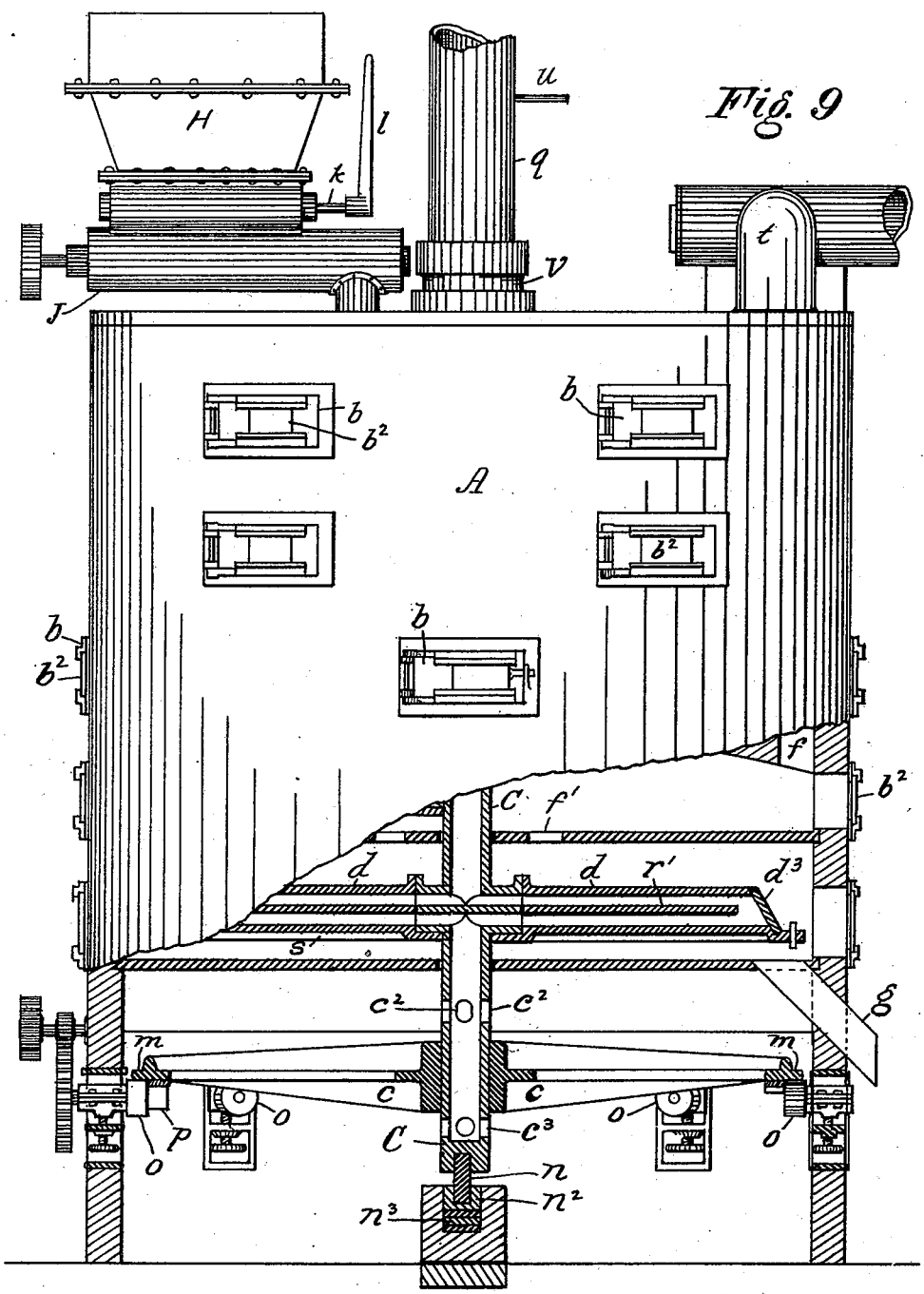

No. 648,183. Patented Apr. 24, 1900.
U. WEDGE.
ROASTING FURNACE.
(Application filed Sept. 29, 1898.)
(No Model.) 4 Sheets—Sheet 4.
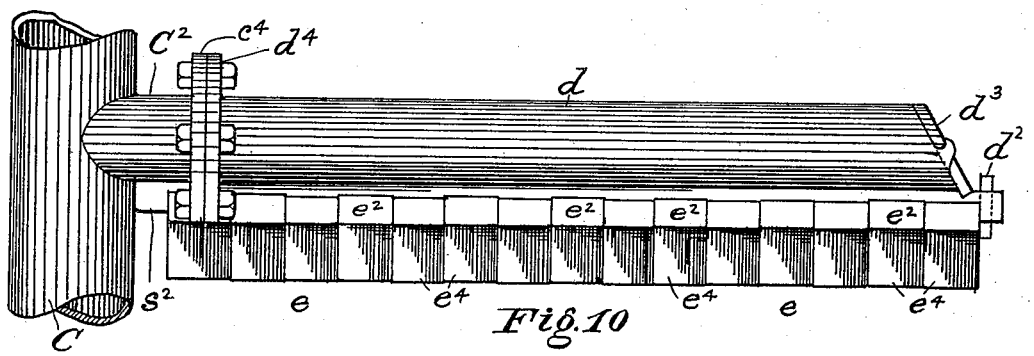
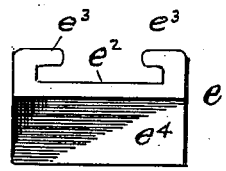
Fig. 11.
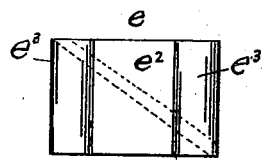
Fig. 11a.
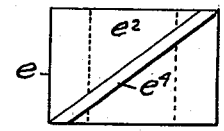
Fig. 11b.
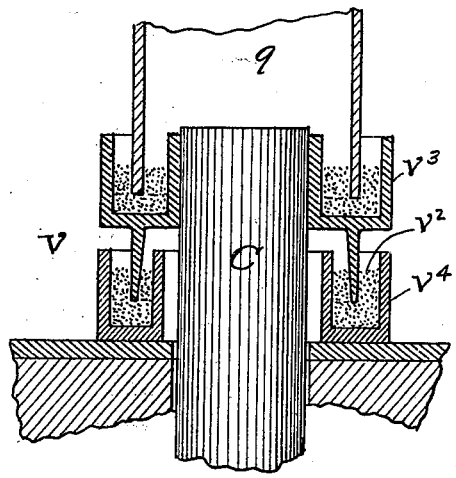
Fig. 12.
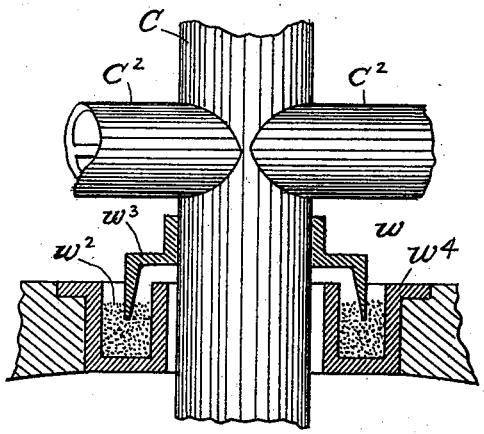
Fig. 13.
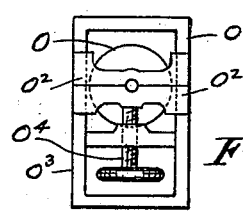
Fig. 14.
Witnesses
Myron B. Vorce.
Ernest G. Wilcox.
Utley Wedge Inventor
By his Attorney
THE NORRIS PETERS CO., PHOTO-LITHO., WASHINGTON, D. C.

UNITED STATES PATENT OFFICE.

UTLEY WEDGE, OF BAYONNE, NEW JERSEY.

ROASTING-FURNACE.

SPECIFICATION forming part of Letters Patent No. 648,183, dated April 24, 1900.

Application filed September 29, 1898. Serial No. 692,186. (No model.)

*To all whom it may concern:*

Be it known that I, UTLEY WEDGE, a citizen of the United States, residing at Bayonne, in the county of Hudson and State of New Jersey, have invented certain new and useful Improvements in Roasting-Furnaces; and I do hereby declare the following to be a full, clear, and exact description of the invention, such as will enable others skilled in the art to which it appertains to make and use the same.

My invention relates to improvements in furnaces for roasting, oxidizing, or desulfurizing ores, &c., burning pyrites for acid-making, and other analogous uses.

The object of the invention is to increase the durability and efficiency of the apparatus and to reduce the expense of constructing, maintaining, and operating the same; and it consists in the novel construction, arrangement, and combination of parts designed to accomplish the aforesaid objects, as hereinafter fully described, and specifically pointed out in the claims.

Figure 1:
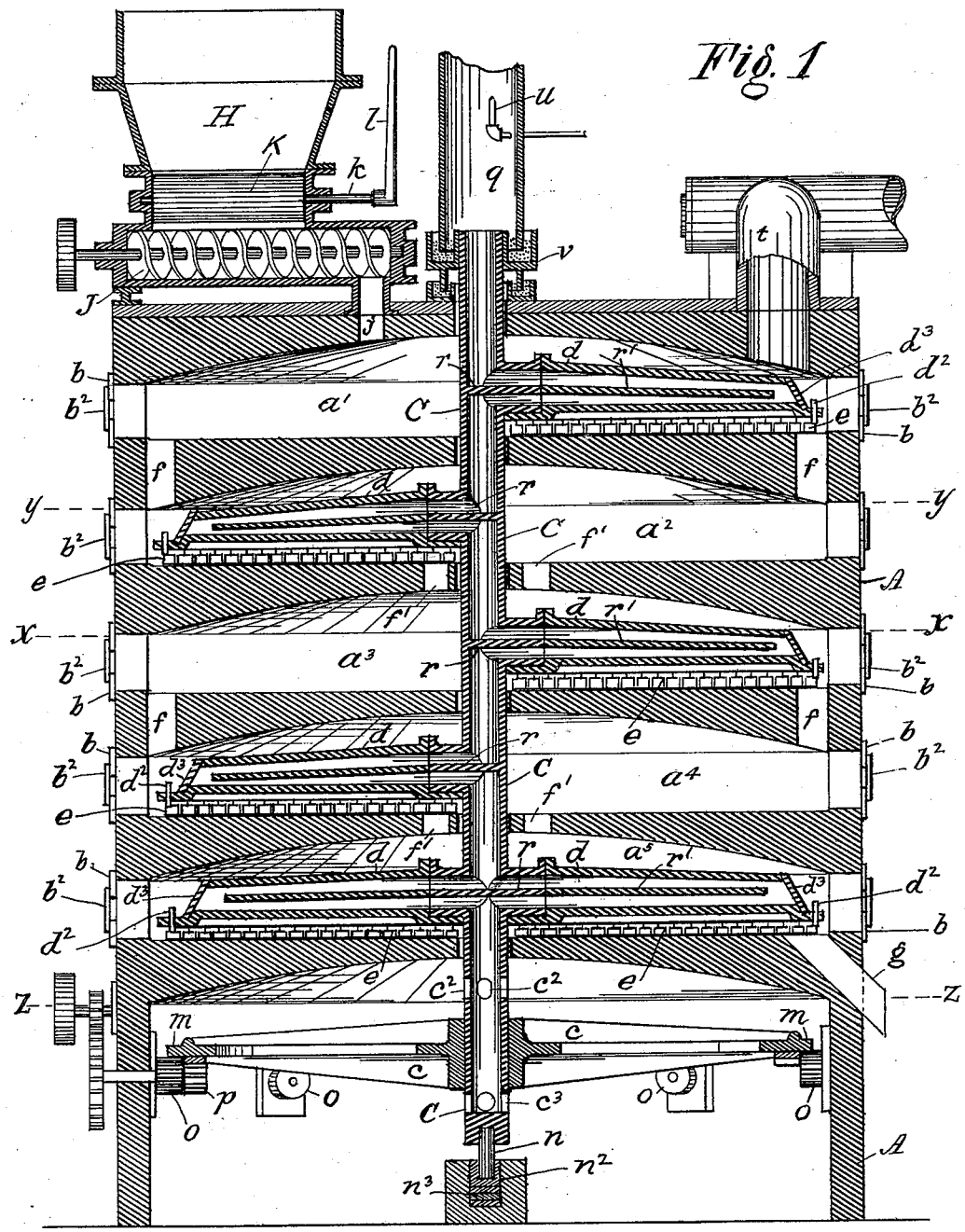
Figure 2:
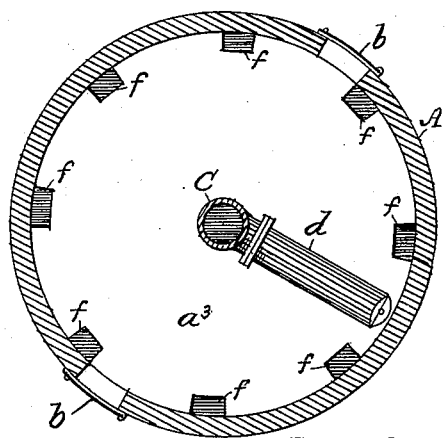
Figure 3:
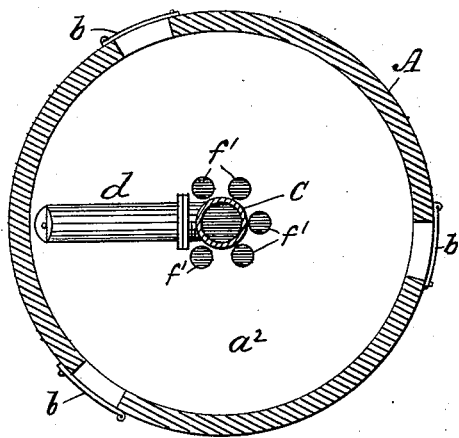
Figure 4:
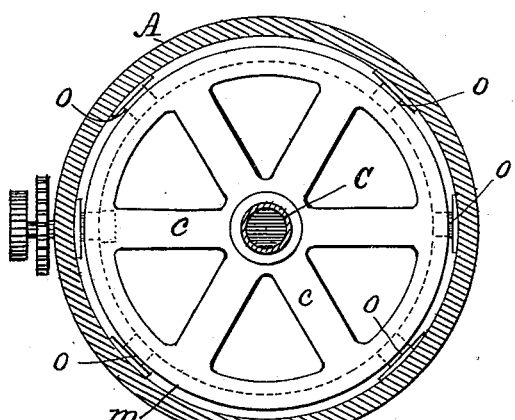
Figure 5:
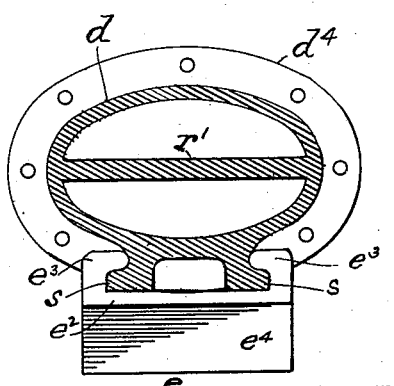
Figure 6:
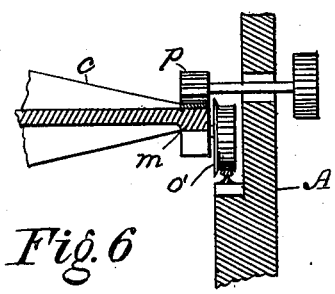
Figure 7:
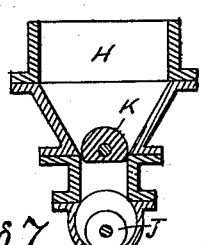
Figure 8:
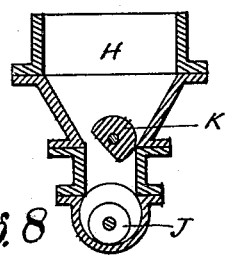

In the drawings hereunto annexed, Figure 1 represents in central vertical section a furnace in the construction of which my invention is illustrated. Fig. 2 represents a horizontal section of the furnace on the line $x\, x$ of Fig. 1. Fig. 3 is a similar section on the line $y\, y$ of Fig. 1. Fig. 4 represents a horizontal section of the structure shown in Fig. 1, taken on the line $z\, z$ of Fig. 1. Fig. 5 is a detail showing a cross-section of the stirring-arm and an elevation of the stirring-blades. Fig. 6 is a detail showing a modified form of construction of the roller-bearing of the shaft and gear. Figs. 7 and 8 are diagrammatic cross-sectional views of the hopper H, showing the feeding device. Fig. 9 represents a modified form of construction of the furnace. Fig. 10 is a detail showing on a larger scale than Fig. 1 the attachment of the arm $d$ to the shaft C and the manner in which the stirring-blades $e\, e$ are spaced apart and supported on the arm $d$ so as to be interchangeable. Fig. 11 is an end view, Fig. 11$^a$ a top view, and Fig. 11$^b$ a bottom view, of one of the stirring-blades $e$ detached from the arm. Fig. 12 is a sectional detail of the seal $v$, showing the sealing material in place. Fig. 13 is a similar sectional detail of the seal $w$, which may or may not be used in the bottom chamber. Fig. 14 is a detail of the adjusting mechanism of the roller-bearings of the rim $m$.

A represents the furnace, constructed with a vertical series of low circular chambers $a'\, a^2\, a^3$, &c., each provided with doors $b$ to afford access to the interior and the upper one communicating by a flue $t$ with a chamber, chimney, or stack. Through each of these chambers extends a vertical hollow shaft C, having in each of the chambers $a'\, a^2$, &c., one or more hollow arms $d\, d$, secured rigidly to the shaft so as to rotate therewith. On the arms $d\, d$ are carried stirring-blades $e\, e$, which in the alternate chambers are oppositely directed, so as to pass the ore or other material from the center to the periphery in one chamber and from the periphery to the center in the next, and so on. Around the outer margin of the chambers in which the blades $e$ pass the ore outward are openings $f\, f$, which communicate with the chamber below, whose floor is pierced at its inner margin with openings $f'\, f'$, which communicate with the next lower chamber, and so on. From the outer side of the lower chamber an opening or chute $g$ discharges the ore or material into any desired receptacle or into a conveyer or elevator (not shown) when it is to be put through some successive treatment.

Above the furnace is supported any suitable feeding device—such, for instance, as a hopper H—into which the ore or other material is placed and from which it is fed gradually by a regulated feed into a conveyer J, which discharges into a chute $j$, opening into the upper one of the chambers $a'$, &c. The regulation of the feed may be effected in any preferred way; but I consider as most efficient for that purpose the apparatus shown in the drawings, in which a cylinder K, cut away on one side and mounted on a shaft $k$, having handle $l$, is so arranged in the bottom of the hopper H that when turned with its widest dimension across the opening of the hopper H it completely closes the same, as seen in Fig. 7, but when turned from this position leaves the hopper-bottom more or less uncovered, as seen in Fig. 8, and allows more or less of the ore to feed through into the conveyer, whose speed governs the rate of feed into the furnace.

The shaft C is rotated by means of a gear-wheel $c$, secured to its lower end, and driven by a pinion $p$, which is actuated by any suitable power. To support the weight of the shaft and its arms, I attach to the lower part of the shaft beneath the lower chamber a wide rim $m$, which rests upon vertically-adjustable rollers $o$, supported on the foundation-wall and arranged at suitable intervals around the circumference of the rim $m$. The rim $m$ may be formed on the gear-wheel $c$, as shown in Fig. 1, and I prefer to so construct it and also to construct the gear-wheel $c$ as a crown-wheel with its cogs formed on detachable segments and secured to the rim of the wheel, so as to permit of easy and quick repair in case of breakage of the cogs; but these details of construction are not important, the essential feature being the wide rim $m$, giving a large diameter of support, and the gear $c$ of a diameter sufficient to give the required power for rotating the shaft and stirrers. To further support the shaft and arms and to reduce friction, the foot of the shaft is stepped upon a pin $n$, supported on or in a suitable rigid step or bearing $n^2$, which I prefer to make adjustable for height, so as to regulate the clearance of the stirring-blades $e$ above the floors of the chambers. This may be effected by placing plates or wedges $n^3$ beneath the pin, as shown, or by the use of heavy adjusting-screws acting on the step $n^2$ or in any suitable manner.

The rollers $o$ are made adjustable for height by supporting their shafts in bearings or boxes $o^2$, which slide vertically in a frame $o^3$, set or built into the wall of the furnace and carrying an adjusting-screw $o^4$, upon which the box or bearing $o^2$ rests. By means of the screws $o^4$ the shaft C and its arms may be leveled and adjusted, so as to compensate for wear or warping and so as to regulate with the utmost nicety the weight resting upon the step $n^2$.

The hollow shaft C is constructed with a branch or branches $C^2$ in each chamber, which branches terminate in flanges $c^4$ (see Fig. 10) and have a partition $r$, which extends entirely across the shaft C, as seen in Fig. 1, and meet a corresponding partition $r'$, which extends lengthwise of the arm $d$ nearly to its end, as seen in Fig. 1. By this construction the air which enters the shaft C through holes $c^2 c^3$ in its lower end is compelled to traverse the entire length of each of the arms $d$ twice and after entering the shaft above the upper arm ascends and escapes through the stack $q$, which connects with the upper end of the shaft C by a sealed joint $v$, as shown. By this circulation of air through the arms which carry the stirring-blades the shaft, arms, and blades are so cooled as to avoid in great part the destructive action of the heat upon the shaft, arms, and stirring-blades, which is enormous in present forms of furnace.

The arms $d\ d$ have a flange $d^4$, which is secured by bolts to the flange $c^4$ on the branches $C^2$, and preferably have a lug or extension $s^2$ on their lower side, which extends beneath the branch $C^2$ and abuts against the side of shaft C, as seen in Figs. 1 and 10. The arms $d$ are also provided on their under side with a rib or ribs $s$, continuous with lug $s^2$ and extending the entire length of the arm, or nearly so, and dovetailed or otherwise so shaped that the stirring-blades $e$ may hang thereon, as shown in Fig. 5. The stirring-blades are so formed as to fit upon the ribs $s$ and hang thereon and so that the blades shall be equally spaced, which I prefer to do by constructing the blades, as shown in Figs. 11, 11$^a$, and 11$^b$, with a rectangular top $e^2$, having lugs $e^3$ to engage the ribs $s$, and a diagonal blade $e$, by which it will be seen that when the stirring-blades $e$ are in place on the arm $d$ their square tops or shoulders $e^2$ abut against each other and the oblique blades $e^4$ are parallel with each other and equally spaced apart, as shown in Fig. 10. The stirring-blades $e$ are secured upon the arm by any suitable means—such, for instance, as a pin $d^2$ inserted in a hole in the end of the arm $d$, as seen in Fig. 1. In case of the breaking or wearing out of one or more of the blades $e$ it is the work of but a moment to remove the pin $d^2$, pull off the blades from the arm, replace broken or worn blades by new ones, restoring to their place the sound blades, and replace the pin $d^2$, leaving all in readiness to proceed. In order to remove any accumulation of dust, &c., which may find its way into the arms $d$, I form said arms with open ends and close the outer ends by a plate $d^3$, which can be removed, access being had to the arms through the doors $b$, and after cleaning the interior of the arms can be replaced and fastened by any suitable means.

Fire-grates, oil-burners, or other means of heating, when required, are provided for the lower chamber in any usual manner, but are omitted if the material is such as will burn by self-combustion, such as pyrites, &c., and the products of combustion pass upward from chamber to chamber through the openings $f f'$, finally escaping by the flue $t$ to the chimney or stack. Dampers or sliding doors $b^2$ are provided in the doors $b$, and by opening these dampers more or less the air supplied to each chamber can be very exactly regulated, while by closing them entirely the air is wholly excluded. Any form of damper may be employed.

The upper part of the furnace becomes intensely hot, so that the shaft and arms in the upper chamber and sometimes in the upper two or three chambers become red-hot, and this causes an extremely great wearing and breakage of the arms and stirring-blades, so much so that in present forms of furnaces this wear and the necessity for constantly throwing away the worn-out or broken parts are a source of great expense. By my improvement I am enabled to very greatly reduce this expense by prolonging the life of the arms and stirring-blades by the cooling effect of the air-current through the arms, and by making the blades detachable and interchangeable a very great further saving is effected. The intense heat in the upper part of the furnace causes a circulation upward through the shaft and arms; but I prefer to aid the natural circulation by causing a forced draft in the stack $q$ by any suitable means, such as a steam-injector $u$ or a fan-blower. Owing to the high heat at the top part of the furnace the iron-work above the furnace becomes highly heated and any bearings for the shaft which might be located at that point would in consequence of such heat be subjected to very great and rapid wear, as it would be impossible to keep them lubricated, as they require to be; but by locating all the bearings at the bottom where they are cool I am enabled to keep them properly lubricated with ease. It is also a part of my invention to construct the floors of one or more of the lower chambers of iron instead of the usual brickwork, whereby the cost of construction is reduced.

The shaft where it passes through the floors of the chambers $a'$ $a^2$, &c., is given a clearance sufficient to avoid friction; but yet to prevent the free escape of gas from one chamber to another the seal at the top of the furnace is filled with any suitable material—such, for instance, as powdered or granular refractory material $v^2$, (see Fig. 12)—which thus prevents the escape of gas from the upper chamber, while interposing scarcely any resistance to the rotation of the shaft C, to which the upper member $v^3$ of the seal is secured, while the lower member $v^4$ is affixed to the top of the furnace. The escape of material from the bottom chamber around the shaft is prevented by discharging it into that chamber at a sufficient distance from the shaft, or such escape, as well as the undue admission of air, may be prevented by the adjusting a similar seal $w$ in the floor of the bottom chamber, the upper member $w^3$ being secured to the shaft and the lower member $w^4$ embedded in the floor and filled with sealing material $w^2$, as shown in Fig. 13. In this way there is maintained an upward draft through all the chambers, and the products of combustion in the lower chambers are caused to pass over all the material in the upper chambers, thus insuring the complete desulfurization or oxidation of the ore or other material, with a very great economy of heat and a vastly-reduced wear and tear of the apparatus.

I am aware that in roasting-furnaces it has been proposed to employ a hollow shaft having hollow arms and that it has been proposed to cool such hollow shafts by the circulation of water through the same or by forcing air through the hollow shaft and into the hollow arms through which it was allowed to escape. The use of water for cooling a structure of this kind is exceedingly objectionable for several reasons. First, the added weight of the water increases very materially the wear upon the bearings and also requires more power for rotating the shaft and its appurtenances. In the second place, it is almost an impossibility to prevent the escape of water into the roasting-chambers where water is used for cooling, because the numerous joints, the severe expansion and contraction of the parts, and the great liability to cracking owing to the different temperature of the various parts have demonstrated that the water, which is subject to considerable pressure, inevitably escapes and mingles with the sulfurous vapors evolved, producing a rapid and extensive corrosion of the apparatus, injuriously cooling the roasting-chambers, and speedily interrupting the operation, besides necessitating expensive repairs. On the other hand, the cooling of the arms by air blown into the hollow shaft has been imperfect, and the escape of air from the arms into the roasting-chambers is in very many cases objectionable and a detriment to the operation, while it interferes materially with the complete control of the admission of air, which is requisite to the most efficient conduct of the operation.

By the means which I have described and shown I avoid the objectionable use of water for cooling the stirring-arms and I secure the most complete and thorough circulation of air through the shafts and all of the arms without incurring the detrimental effects of the escape of air from the arms into any of the furnace-chambers. The partitions $r$ $r'$, which completely close the shaft at each arm, are particularly efficient in governing this circulation of air through the entire length of the arms and back. By avoiding the emission of air from the stirring-arms I materially increase the range of availability of the furnace by rendering it efficient for operations in which the exclusion of air is essential. By the provision of the plates $d^3$, by which the interiors of the arms and shaft are readily inspected, the necessity for repairs to any portion of the stirring apparatus is more readily detected and the life of the whole apparatus prolonged and made practically indestructible.

What I claim as my invention, and desire to secure by Letters Patent, is—

1. In a roasting-furnace the combination with the roasting-chamber of a central shaft extending vertically through the roasting-chamber and having in said chamber arms provided with stirring-blades, a rim secured to said shaft beneath said chamber, wheels or rollers supporting said rim, and means for continuously rotating said shaft, substantially as described.

2. In a roasting-furnace the combination with the roasting-chamber of a central hollow shaft extending vertically through the roasting-chamber and having in said chamber hollow arms provided with stirring-blades, a rim secured to said shaft beneath said chamber, wheels or rollers supporting said rim, means for maintaining a circulation of air through said shaft and arms, and means for continuously rotating said shaft, substantially as described.

3. In a roasting-furnace the combination with the roasting-chamber of a central shaft extending vertically through the roasting-chamber and supported upon a step at the bottom, hollow arms attached to said shaft in the roasting-chamber and carrying stirring-blades, a rim secured to said shaft beneath said chamber, wheels or rollers supporting said rim, and means for continuously rotating said shaft, substantially as described.

4. In a roasting-furnace in combination with the roasting-chamber, a central shaft extending vertically through the roasting-chamber and having in said chamber arms provided with detachable stirring-blades, a rim secured to said shaft beneath the roasting-chamber, wheels or rollers supporting said rim, and means for continuously rotating said shaft, substantially as described.

5. In a roasting-furnace in combination with the roasting-chamber, a central hollow shaft extending vertically through the roasting-chamber and having in said chamber hollow arms provided with detachable stirring-blades, a rim secured to said shaft beneath the roasting-chamber, wheels or rollers supporting said rim, and means for continuously rotating said shaft, substantially as described.

6. In a roasting-furnace in combination with the roasting-chamber, a shaft extending vertically through the roasting-chamber and having in said chamber arms provided with detachable stirring-blades, a rim secured to said shaft below the roasting-chamber and extending underneath the same, wheels or rollers supporting said rim beneath the roasting-chamber, and means for rotating said shaft, substantially as described.

7. In a roasting-furnace in combination with the roasting-chamber, a central shaft extending vertically through the roasting-chamber and having in said chamber arms provided with detachable stirring-blades, a rim secured to said shaft below the roasting-chamber, wheels or rollers mounted in vertically-movable bearings and supporting said rim, a screw or equivalent means for vertically adjusting said bearings, and means for rotating said shaft, substantially as described.

8. In a roasting-furnace in combination with the roasting-chamber, the hollow shaft extending vertically through said chamber and having air-inlets at a point below said chamber, a hollow branch from said shaft in said chamber, a partition across said shaft and through said branch, a hollow arm secured to said branch, a series of detachable stirring-blades secured to said arm, means for rotating the shaft, and means for maintaining a circulation of air through said shaft and arms, substantially as described.

9. In a roasting-furnace in combination with the roasting-chamber, the hollow shaft extending vertically through said chamber and having air-inlets at a point below said chamber, a hollow branch from said shaft in said chamber, a partition across said shaft and through said branch, a hollow arm secured to said branch, and having a partition corresponding with that of the shaft and extending nearly its entire length, a series of detachable stirring-blades secured to said arm, means for rotating the shaft and means for maintaining a circulation of air through said shaft and arms, substantially as described.

10. In a roasting-furnace in combination with the roasting-chamber, the hollow shaft extending vertically through said chamber and having air-inlets at a point below said chamber, a hollow branch from said shaft in said chamber, a partition across said shaft and through said branch, a hollow arm secured to said branch and having a partition corresponding with that of the shaft and extending nearly its entire length, a detachable plate closing the outer end of said arm, a series of detachable stirring-blades secured to said arm, means for rotating the shaft, and means for maintaining a circulation of air through said shaft and arms, substantially as described.

11. In a roasting-furnace having a hollow shaft and means for rotating the same, the combination with the shaft of a hollow arm having on its under side a longitudinal projecting rib, stirring-blades having shoulders provided with lugs which fit upon said rib, and a pin or equivalent locking device at the outer end of said arm for securing said blades removably upon said arm, substantially as described.

12. In a roasting-furnace having a hollow shaft and means for rotating the same, the combination with the shaft of a hollow arm having on its under side a longitudinal projecting rib, stirring-blades having shoulders provided with lugs which fit upon said rib, a pin or equivalent locking device at the outer end of said arm for securing said blades removably upon said arm, and a detachable plate closing the outer end of said arm, substantially as described.

13. In a roasting-furnace having a tier of chambers, the combination with the furnace-chambers of a shaft provided with a branch in each chamber, arms adapted to be detachably secured to said branches and having on their under side a rib projecting beyond the arm and underneath the branch, stirring-blades removably fitting on said rib throughout its length, a pin or equivalent means for securing the blades upon the rib, and means for rotating the shaft, substantially as described.

14. In a roasting-furnace having a tier of chambers, the combination with the furnace-chamber of a hollow shaft provided with a branch in each chamber, hollow arms adapted to be detachably secured to said branches and having on their under side a rib projecting beyond the arm and underneath the branch, stirring-blades removably fitting on said rib throughout its length, a pin or equivalent means for securing the blades upon the rib, and means for rotating the shaft, substantially as described.

15. In a roasting-furnace having a tier of chambers, the combination with the furnace-chambers of a hollow shaft provided with a branch in each chamber, hollow arms adapted to be detachably secured to said branches and each having on its under side a rib projecting beyond the arm and underneath the branch, a detachable plate closing the outer end of said arm, stirring-blades removably fitting on said rib throughout its length, a pin or equivalent means for securing the blades upon the rib, and means for rotating the shaft, substantially as described.

16. In a roasting-furnace having a tier of chambers, the combination with the furnace-chambers of a central hollow shaft extending vertically through the chambers and having a horizontally-partitioned branch in each chamber, hollow arms detachably secured to said branches, and having partitions corresponding to those of the branches, stirring-blades removably attached to said arms, a wide rim secured to said shaft below said roasting-chambers, adjustable rollers supporting said rim at its periphery, air-inlets to said shaft below said chambers, means for rotating said shaft, and means for maintaining a circulation of air through said shaft and arms, substantially as described.

In testimony whereof I hereto affix my signature in presence of two witnesses.

UTLEY WEDGE.

Witnesses:
CHAS. E. ANNETT,
FANNIE MORRIS.